United States Patent

[11] 3,579,253

[72] Inventors John E. Edington;
Merville L. Warnock, Indianapolis, Ind.

[21] Appl. No. 774,376
[22] Filed Nov. 8, 1968
[45] Patented May 18, 1971
[73] Assignee Bell Telephone Laboratories, Incorporated
Murray Hill, Berkeley Heights, N.J.

[54] COIN TELEPHONE CIRCUIT FOR DIAL-TONE-FIRST SERVICE
11 Claims, 2 Drawing Figs.

[52] U.S. Cl. .......... 179/6.3
[51] Int. Cl. .......... H04m 17/02
[50] Field of Search .......... 179/6.3

[56] References Cited

UNITED STATES PATENTS

| | | | |
|---|---|---|---|
| 1,855,724 | 4/1932 | Nelson | 179/6.3 |
| 2,791,634 | 5/1957 | Lomax | 179/6.3 |
| 2,835,738 | 5/1958 | Quatman | 179/6.3 |
| 3,409,739 | 11/1968 | Joel, Jr. | 179/6.3 |

*Primary Examiner*—William C. Cooper
*Assistant Examiner*—Jan S. Black
*Attorneys*—R. J. Guenther and Edwin B. Cave

ABSTRACT: A conventional coin telephone circuit is modified for dial-tone-first service (limited service without a coin deposit) by various interrelated circuit changes which also provide additional features including a shift from an initial rate mode to a subsequent deposit mode in response to battery reversal and a means for indicating that an adjustable initial rate deposit or an overtime deposit has been made.

Patented May 18, 1971

3,579,253

2 Sheets-Sheet 1

INVENTORS J. E. EDINGTON
M. L. WARNOCK

BY [signature]

ATTORNEY

COIN TELEPHONE CIRCUIT FOR DIAL-TONE-FIRST SERVICE

BACKGROUND OF THE INVENTION

1. Field of the Invention

This invention relates to coin telephone systems and more particularly to a system for limited coin-free or dial-tone-first service in order to provide emergency access to an operator or to a preselected number or numbers.

2. Description of the Prior Art

A system providing coin-free access to an operator or to a preselected number from a pay station telephone serves the primary function of making limited telephone service available, particularly under emergency conditions when the calling party does not have the coinage required for the usual minimum deposit. The desirability of such a service has long been recognized but cost and technical complexities have heretofore impeded its development.

The major problem in devising a workable emergency service of the type indicated relates to the fact that most coin telephone systems are specifically designed to withhold all service until the customer deposits coins equal to the local initial rate. Prepay systems of this type are employed because, among other reasons, they are considerably less susceptible to a variety of fraudulent techniques that may be used successfully in post pay systems, they discourage frivolous use of the telephone and they invariably achieve a higher collection ratio. Coin-free access systems of the prior art are, however, generally characterized by an unacceptably high incidence of fraudulent use, or are unduly complex and therefore tend to be unreliable or prohibitively expensive. Application Ser. No. 460,716 now U.S. Pat. No. 3,406,256 filed on June 2, 1965 by L. A. Strommen illustrates one prior art approach to the solution of the problems indicated.

One of the primary difficulties encountered in converting a telephone system from prepay coin service to dial-tone-first service involves a seemingly separate system function that is in fact closely related thereto from the standpoint of the circuitry employed. This function involves the capability of the station circuit to distinguish between the initial rate deposit period and a subsequent deposit period and in particular relates to the manner in which the station circuit is signaled to realize that capability. During the initial rate deposit period a conventional coin telephone stores coin deposits until the total value of the initial rate has been reached, while in the subsequent deposit period the deposit of each coin is signaled (usually to the operator) as soon as the deposit is made. In conventional ground start prepay service, the presence of current in the tip lead is used as the signal to transfer the coin telephone from the initial rate deposit to the subsequent deposit state. Ground start system, however, in addition to their general unsuitability for dial-tone-first service circuits, are also far short of ideal insofar as transmission quality and noise level are concerned.

SUMMARY OF THE INVENTION

The broad objects of the invention are to avoid the difficulties indicated, to reduce the cost and complexity of dial-tone-first telephone systems and to reduce the possibility of fraudulent operation of such systems. These objects and related objects are achieved in accordance with the principles of the invention by employing circuitry at the telephone set that operates on a loop start basis. As soon as the customer lifts the handset, a call initiation is made and the central office originating equipment is connected. The customer thus receives dial tone before coins are deposited. To provide the coinless access feature of dial-tone-first, the dial is made operative at this time.

The switching sequence for a toll call is modified in two different ways, depending on whether the call is routed through a traffic service position or a cord board. For the traffic service position, the operation is conventional except that when the operator is connected to service the call, a signal is generated back to the originating central office. This signal causes the office equipment to reverse the polarity of the talking battery to the station which in turn causes the coin telephone to transfer from the initial rate mode of operation to the subsequent deposit mode. In the subsequent deposit state, coin deposit signals are generated conventionally as soon as the coins are deposited and when the operator disconnects, the connections to the talking battery are reversed to restore normal polarity. The cord board operation also uses battery reversal to change the state of the set for toll (subsequent) coin deposit signaling, but the battery is permanently reversed throughout the remainder of the call.

In accordance with the invention, the central office option of automatic detection of overtime deposits on local calls is also modified to provide an interval of reversed battery to transfer the coin telephone to the subsequent deposit state for registration of the overtime deposit. The detection of this deposit is a test for coin ground and is made with a polarity opposite that used for the initial rate deposit ground test.

DESCRIPTION OF AN ILLUSTRATIVE EMBODIMENT

Figure 1:
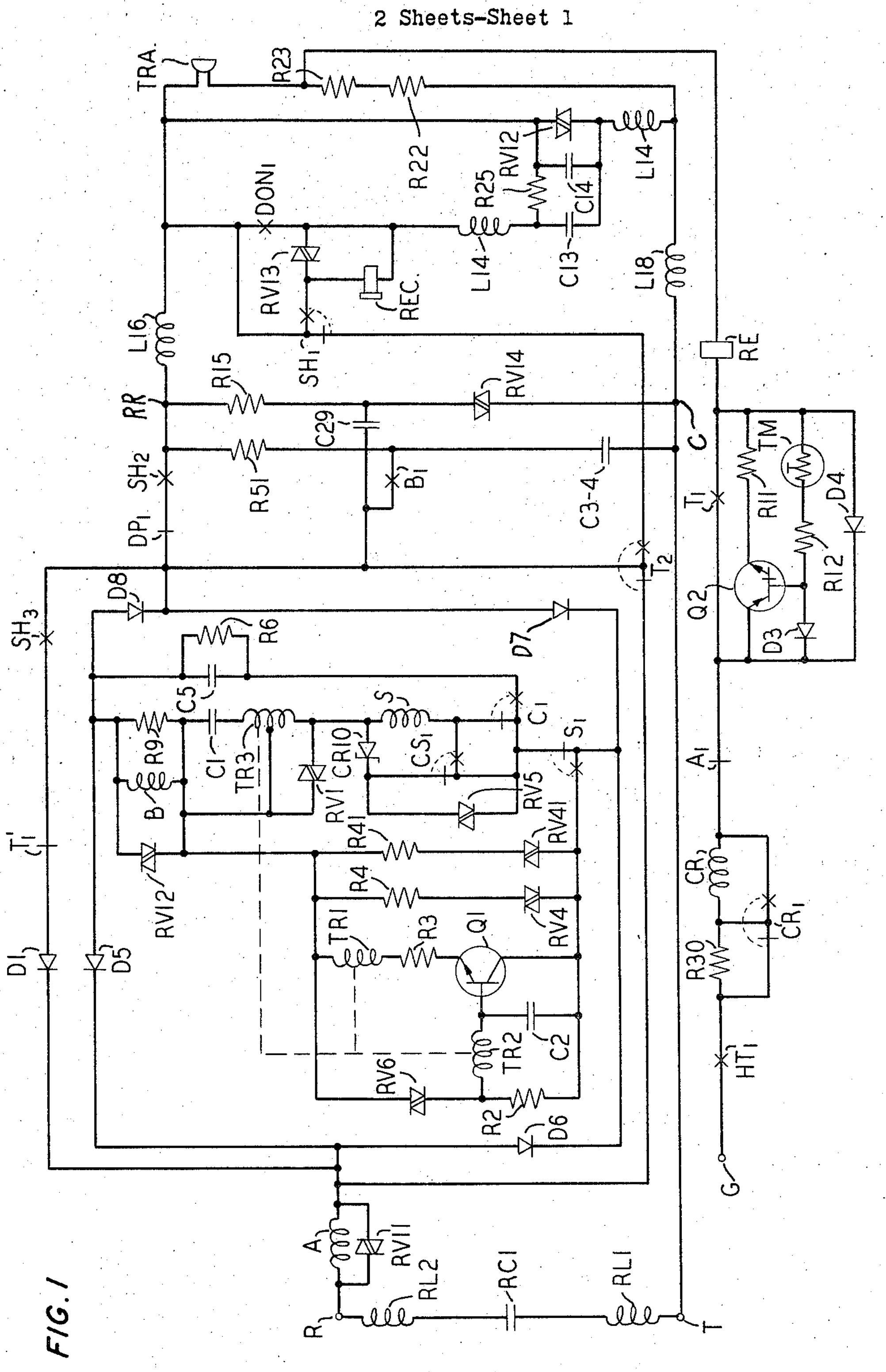
FIG. 1 is a schematic circuit diagram of a coin telephone circuit in accordance with the invention.

The circuitry shown in FIG. 1 employs conventional detached contact notation in which an "X" denotes a make or normally open contact and a "—" indicates a break or normally closed contact. Certain of the contacts shown, such as $C_1$, $CS_1$, $T_1$, $T^T{}_1'$, and $T_2$, are operated conventionally by corresponding cams on an associated totalizer mechanism. Although the totalizer mechanism is not shown herein, such mechanisms are well known in the art as shown, for example, by U.S. Pat. No. 3,146,312 issued Aug. 25, 1964 to E. R. Andregg and L. A. Strommen.

The circuit of FIG. 1 may be described broadly in terms of subcircuits which include an oscillator circuit, a coin identification signal speed control circuit, a telephone speech network, an operating control and logic circuit and a voltage and current sensitive coin return network. The oscillator circuit, which is utilized to generate tone pulse coin identification signals, employs a transistor Q1 with conventional emitter-to-base coupling provided by the transformer coils TR1 and TR2. Other circuit elements included in the oscillator circuit are: the varistors RV1, RV4, RV41 and RV6; the resistors R2, R3, R4 and R41; the capacitors C1 and C2; and the coil TR3 which is inductively coupled to the coils TR1 and TR2. The signal frequency is determined primarily by the combination of capacitor C1 and coil TR3.

The coin identification signal speed control circuit includes the coil of a stepping motor S which is in series with the ring lead R. The rate at which the stepping motor S operates, which controls the rate of operation of the transfer contacts $S_1$, is determined by the reference voltage across it which, in turn, is established by the magnitude of the shunting impedance of the varistor RV5 and the diode CR10. For low speed action, which is employed to signal the deposit of a nickel or a dime, the impedance shunting the stepping motor S results from the voltage limiting characteristic of the Zener diode CR10, the varistor RV5 being shunted by a path that includes the normally closed break contact $CS_1$. With the deposit of a quarter, however, transfer contacts $CS_1$ operate which opens the shunt path across the varistor RV5. The resulting relatively high impedance across the stepping motor S raises the voltage across it which in turn increases the stepping rate and hence the signaling rate. The oscillator circuit of which transistor Q1 is the active element is activated by the operation of the stepping coil break contact $S_1$ which action diverts current in the ring lead R to the oscillator circuit.

The telephone speech network is coupled to the ring lead R by an inductor L16 at terminal RR and to tip lead T by an inductor L18 at terminal C. The speech network is wholly conventional and is included herein merely to ensure disclosure of a complete embodiment of the invention. The upper terminal of the transmitter TRA connects to ring lead R via the inductor L16, and the lower terminal connects to the upper terminal of the resistor R23 and is extended to the tip lead T through the resistors R23 and R22 and the inductor L18. The receiver REC is similarly bridged between the ring lead R and the tip lead T as follows: conduction from the upper terminal of the receiver REC to the ring lead R is provided through the switchhook make contact $SH_1$ and the inductor L16. Conduction from the lower terminal of the receiver REC to tip lead T is provided through multiple paths that include the inductor L14, capacitors C13 and C14, resistor R25, varistor RV12 and inductors L14 and L18. The receiver REC is shunted by the dial-off-normal make contact $DON_1$ when that contact is closed during a dialing operation with the receiver off-hook.

The coin return network or ground path, which includes the coin relay CR and the reset electromagnet RE, provides a means for applying ground to the telephone speech network and hence through to the logic circuit. The grounding path extends through the hopper trigger make contact $HT_1$, resistor R30 shunted by the coin relay break contact $CR_1$, and the coil CR of the coil relay shunted by the coin relay make contact $CR_1$. The resistor R30 is inserted into the line by the operation of the coin relay transfer contacts $CR_1$ in order to limit current flow from the central office when the coin relay CR is operated. The grounding path continues through the reset electromagnet RE by way of multiple parallel paths which include a totalizer make contact $T_1$, the series combination of an SCR device $Q_2$ and a resistor R11, the series combination of a diode D3, a resistor R12, and a thermistor TM, and a shunting diode D4. From the reset electromagnet, which is employed to reset the totalizer, the ground applying path continues to the lower terminal of the transmitter TRA in the speech network and thence to the tip lead T.

The specific functions of the coin control and logic circuitry and its interrelationship with the circuitry already described may best be presented in terms of a step-by-step operational circuit description of the complete system.

In the standby condition the central office has a negative battery on the ring lead R and the tip lead T is grounded. As soon as the customer lifts the handset, ring-to-tip current flows through the A relay, the normally closed $T_2$ contact, the normally closed dial contacts $DP_1$, the operated switch hook contact $SH_2$ and thence through the speech network. The ring-to-tip current initiates the call at the central office. The customer hears dial tone and the dial (contacts $DP_1$) is operative as soon as the appropriate central office is connected. The loop current operates the A relay to open the ground lead at the $A_1$ break contact.

The customer is then instructed to deposit coins before dialing for all calls other than the listed "no charge" numbers. The first nickel deposited transfers the $T_2$ and the $HT_1$ contacts. Loop current flows through the A relay, diode D1, closed contacts $T_1'$, $SH_3$, $DP_1$ and $SH_2$ to the speech network. The diode D1 shunts the loop current around the coin signal and totalizer circuit. A deposit that exceeds the preset initial rate causes the rate contacts $T_1$ and $T_1'$ to transfer and latch and as a result, the closed $T_1$ make contact in the coin return network completes a path for the coin ground present indication during the initial rate deposit test. Opening of the $T_1'$ break contact opens the shunt around the totalizer, allowing loop current to flow through the polarity guard, RV5–CR10, break contacts $C_1$ and $S_1$, the totalizer stepping coil S, the coin signal oscillator excitation coil TR3 and the B relay coil. The totalizer then "reads out" (steps back to a home position) and the transfer contacts $T_2$ return to their standby, unoperated condition. The rate contacts $T_1$ and $T_1'$ remain latched in the operated state until a coin collect or return pulse operates the reset electromagnet RE. The set is then in the normal off-hook condition with the totalizer contacts $C_1$, $CS_1$, $S_1$ and $T_2$ in normal position, with contacts $T_1$ and $T_1'$ transferred, and the A relay operated to open the ground connection.

The purpose of the B relay, the coil of which is shunted by a varistor RV12 and by a resistor R9, is to switch a capacitor C3–4 across the network by operating the make contact $B_1$ so that coin signals cannot be heard by the customer. By thus isolating the customer from normal coin signals, the possibility of fraudulent simulation of such signals is substantially reduced. It should be noted that the capacitor C3-4 is connected across the set only when the totalizer short is removed, which is to say, when the totalizer is reading out.

The central office initial deposit test for coin ground is made with a negative voltage on the tip lead T, and with the ring lead R open, current flow being limited to less than 20 milliamperes. With this polarity and voltage combination the SCR device Q2 is nonconducting. The initial rate deposit test current flow is from ground G through the hopper trigger contacts $HT_1$, the coin relay CR, the closed contacts $A_1$ and $T_1$, the reset electromagnet RE and through the speech network to the tip lead T. It may be noted that at this point relay A is nonoperated since the ring lead R is opened. If this initial rate test is met, the call is connected in the normal manner. The absence of an initial rate deposit indication will cause the call to be routed to an automatic announcing arrangement in the central office which informs the customer that a deposit is necessary.

Figure 2:
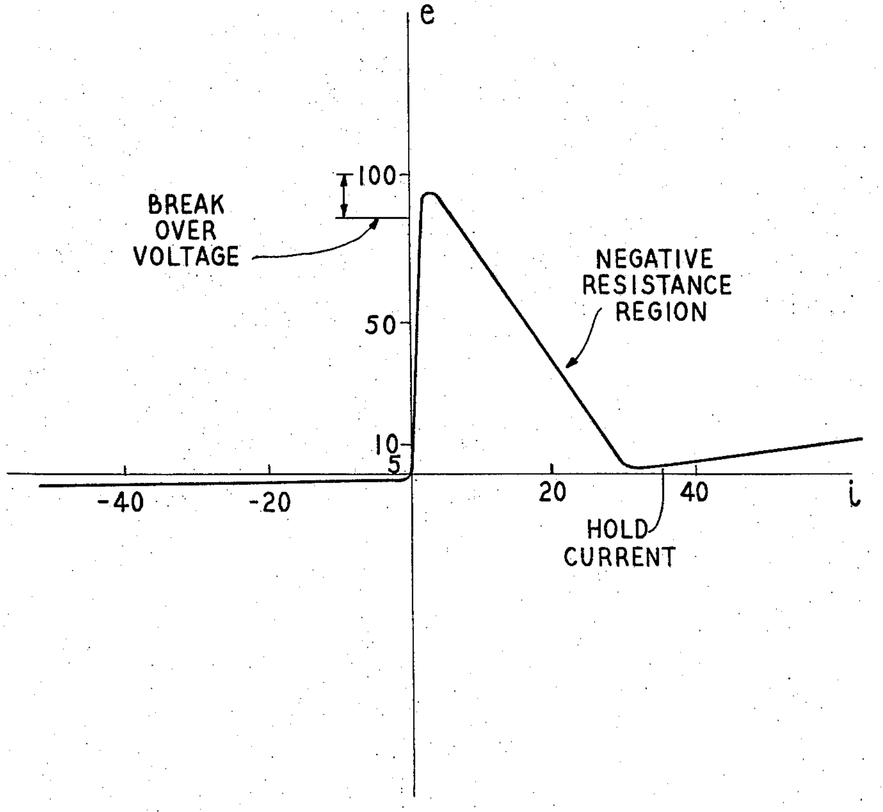
FIG. 2 is a current-voltage plot of a portion of the ground control circuit including the SCR device Q2 and the paths parallel thereto.

The coin collect and refund operations are made with plus or minus 120 volts on the tip lead T and with the ring lead R open to ensure that the A relay is non-operated. The collect operation with plus 120 volts on the tip lead T causes current flow through the diode D4, the reset electromagnet RE and the coin relay CR. Refund voltage of minus 120 volts on the tip lead T results in current flow through the reset electromagnet RE, contacts $T_1$ and the coin relay CR. Since the reset electromagnet RE operates rapidly which results in the activation of the $T_1$ contacts before the slower operating coin relay CR can operate, another low impedance current sustaining path in parallel with the $T_1$ contacts is provided in accordance with the invention. The SCR device Q2 and the resistor R11 provide this low impedance path in that the SCR is designed to break down and hold on a negative voltage greater than minus 65 volts and on currents in excess of 40 milliamperes. The transmission characteristics of such an SCR device in combination with the parallel paths indicated are shown by the plot in FIG. 2. In summary, the coin return network is only switched ON, i.e., ground is extended to the set, by a negative coin return potential after the $T_1$ contact operates. It remains off with positive potential. Diode D4, however, provides a shorting path on positive battery.

In placing a local call which involves one of the preselected or "noncharge" numbers, the customer lifts the handset and receives dial tone in the manner described above. The customer then dials the desired number which, through screening by the central office, is connected without an initial rate deposit test. In the case of a toll call however, dial tone is obtained as described above an no deposit is required until requested by the operator. The call is then dialed on a 0 basis (operator dialed), a 0+ basis (operator assistance-customer dialed), or a 1+ basis (customer dialed—station-to-station).

As soon as the station is cut through to the operator trunk, the polarity of the talking battery is reversed. The positive potential on the ring lead R back biases diode D1, thus allowing the totalizer to restore and generate coin deposit signals after each deposit irrespective of the state of the totalizer contacts $T_1$.

Operation of the system where a traffic service position is involved is modified only in that the talking battery is reversed during the time the operator is connected. This action transfers the coin telephone to the subsequent deposit state for the signaling of all coin deposits to the operator and disables the dial. Since the proper polarity is restored after the operator drops off, end-to-end signaling using the dial is then possible.

An additional modification in procedure is involved when traffic service position type of operation is employed in that coin retention is not used, owing to the fact that no coin is required to reach the traffic service position. A coin refund signal is generated on all calls reaching the traffic service position, however, in order to ensure coin refund to the customer in the event that a coin is deposited in error.

In the case of an abandoned call, for example a hang-up which occurs during any portion of the call before connection to the called party, the normal abandoned call coin refund switching sequence takes place unless the totalizer is off normal. An abandoned call with the totalizer off normal could take place with an insufficient deposit. As soon as the customer replaces the handset, switch hook contacts $SH_3$ open the shunt around the totalizer. Loop current flows through the A relay, the totalizer (not shown), the normally open totalizer contacts $T_2$, the normally closed switch hook contacts $SH_1$ and the speech network to the tip lead T. This current operates the totalizer until it reaches the home position. When the totalizer transfer contacts $T_2$ are operated back to their normal position, the loop is opened and the central office recognizes the abandoned call and applies a refund voltage to the tip lead.

A conventional feature of prepay coin telephone sets is the refund of all coins deposited when the handset is on-hook. The change from closing a ground path to initiate a call to the employment of loop current flow to initiate a call, however, renders this conventional, operational feature somewhat more difficult to provide. A deposit with the handset on-hook allows loop current to flow through the A relay, the normally open totalizer contacts $T_2$, the normally closed switch hook contacts $SH_1$ and the speech network to the tip lead T. This current initiates the request for service from the central office and also, as described, operates the totalizer. As soon as the totalizer restores, the loop is open and if the central office has recognized the start, a call abandoned condition is seen by the central office. Under this condition, the refund pulse is sent by the central office and the customer receives his money back. If the totalizer restores before the central office connects the proper equipment, however, the request for service is not detected and no refund is obtained. To receive a refund under those conditions, it is necessary to lift the handset, listen for dial tone and then hang up. Posted instructions set forth this procedure.

In the case of an incoming call, a call terminating at the coin telephone set, the same flow of loop current takes place as described above for the normal off-hook condition. The A relay operates to remove the ground for transmission improvement.

Certain additional details of various features of the circuit should be mentioned to ensure a complete disclosure of all aspects of the illustrative embodiment of the invention. The detection, storing and signaling of deposited coins are handled in substantially the same manner as in a conventional prepay circuit except for the polarity guard and the means employed for distinguishing between the initial and subsequent deposit periods. The rate contact $T_1'$ and the diode D1 shunt the loop current around the totalizer when the handset is off-hook, and the talking battery is connected with negative polarity on the ring lead R. This action causes the totalizer to store initial deposit information until the initial rate is reached.

The ground isolation relay A presents a low impedance to reduce line imbalance and loop length reduction. The operate current is less than the current in a maximum loop, approximately 15 milliamperes, with a release current of approximately 2 milliamperes. The varistor RV11 in parallel with the winding of the ground lifting A relay coil provides a low AC impedance to prevent AC imbalance transmission loss.

The circuitry around the totalizer rate contact $T_1$ in the ground path is necessary to provide a refund and collect path when the contact $T_1$ is not made and after the reset electromagnet RE opens the $T_1$ contact. The contact also provides a polarity sensitive path for voltages less than 80 volts for the five cent deposit and initial rate deposit detection operations.

The diode $D_3$ has a breakover voltage equal to the desired breakover voltage of the entire circuit. When the terminal voltages reach this breakover level, the current into the gate electrode operates the SCR device Q2 and the circuit becomes a low resistance. The thermistor TM is used to compensate for temperature induced changes in the hold current characteristics of the SCR device Q2. As the temperature increases, the holding current of the SCR Q2 is reduced, but the thermistor TM shunts more current around the gate to cathode junction so that the holding current of the entire circuit remains within the system limits.

The circuit of FIG. 1, although specifically designated for rotary *d—c* dial operation may of course be readily adapted for use in combination with a multifrequency dial.

It is to be understood that the embodiment described herein is merely illustrative of the principles of the invention. Various modifications thereto may be effected by persons skilled in the art without departing from the spirit and scope of the invention.

We claim:

1. In a coin telephone set, operable selectively in both the prepay and dial-tone-first mode, in combination, means responsive to an off-hook condition for initiating the flow of loop current and establishing thereby a dial-tone-first mode without a coin deposit, means responsive to a battery polarity reversal for shifting said set from said dial-tone-first mode of operation to said prepay mode of operation, and means operative in the on-hook condition responsive to the deposit of a coin for establishing a refund request condition.

2. In a dial-tone-first coin telephone set adapted to enable a customer to dial preselected numbers without requiring a coin deposit while requiring a coin deposit for all other numbers, in combination, first and second terminals for connecting to the ring and tip leads of a telephone line, respectively, dial signal generating means, a coin signal generating circuit, a first relay including a coil, a telephone speech network, a plurality of contacts operated by a totalizer mechanism, and means responsive to an off-hook condition for initiating a loop current flow from said first to said second terminals, thereby to alert a connecting central office to said off-hook condition, the path for said current including said coil, a normally closed pair of the contacts, normally closed contacts of said dial signal generating means, operated closed switch hook contacts and a portion of said speech network.

3. Apparatus in accordance with claim 2 further including, a source of reference potential, and means including normally closed contacts of said relay and a portion of said speech network for connecting said source to said second terminal, said last named connecting means being rendered inoperative by the operation of said relay by said current and the associated opening of said normally closed contacts of said relay, thereby ensuring the flow of said current to said second terminal rather than to said source.

4. Apparatus in accordance with claim 2 further including, a source of reference potential, means for connecting said source to said second terminal via a portion of said speech network, said last named means comprising a conductive path including, in series circuit relation, a set of coin hopper trigger make contacts, a resistive device, the operating coil of a coin relay, a set of break contacts operated by said first relay, a set of make contacts operated by the totalizer mechanism of said set and the reset electromagnet of said coin totalizer.

5. Apparatus in accordance with claim 4 wherein said resistive device is shunted by a set of break contacts of said coin relay, wherein said coil of said coin relay is shunted by a pair of make contacts of said coin relay, and wherein said make contacts of said coin totalizer are shunted by a first path including an SCR device, by a second path including the series combination of a first nonlinear impedance device and a thermistor and by a third path including a second nonlinear impedance device, said SCR device providing a low impedance current sustaining path to ensure the completion of refund and collect operations after said reset electromagnet operates.

6. A circuit for a coin telephone set operable, selectively, in both the prepay and dial-tone-first mode comprising, in combination, first and second terminals each connectable to the ring and tip leads, respectively, of a telephone line, a voice circuit including third and fourth terminals, a transmitter and a receiver, means directly connecting said second terminal to said fourth terminal, a coin totalizer including a plurality of sets of contacts, a first relay having a first coil, a second relay having a second coil, means connecting said first terminal to said third terminal including, in series relation, said first coil, one of said sets of contacts, dial pulse contacts and first switch hook contacts, a source of reference potential, means including a portion of said voice network connecting said source to said fourth terminal, said last named means further including contacts operated by said first relay, a coin signal generator circuit, and means responsive to the operation of said second relay for isolating said voice circuit from said generator circuit thereby to preclude customers from hearing signals produced by said generator circuit.

7. Apparatus in accordance with claim 6 wherein said isolating means includes contacts operated by said second relay, the operation of said last named contacts connecting a shunt capacitor across said generator circuit.

8. In a circuit for a coin telephone set operable selectively in both the prepay and dial-tone first modes, a coin refund-collect ground test comprising, in series circuit relation, a ground terminal, resistive means, a coin relay coil, contact means operatively responsive to the flow of loop current in said circuit for opening said path, a set of normally open coin totalizer contacts and a totalizer reset electromagnet, a first set of normally closed contacts of the coin relay shunting resistive means, and a second set of normally open contacts of said coin relay shunting said coin relay coil, a first path including an SCR device shunting said coin totalizer contacts, a second path including the series combination of a nonlinear impedance device and a thermistor shunting said coin totalizer contacts, and a third path including a nonlinear impedance device shunting said coin totalizer contacts.

9. Apparatus in accordance with claim 8 including first and second terminals each connectable, respectively, to the ring an tip leads of a telephone line, a voice network including a third terminal and said second terminal, a coin signal generating circuit, means including said coin signal generating circuit connecting said first and third terminals, and means including a portion of said voice network connecting said ground test path to said second terminal.

10. Apparatus in accordance with claim 9 wherein said means connecting said first and third terminals includes the relay coil associated with the contact means operatively responsive to the flow of loop current.

11. In a dial-tone-first coin telephone set, in combination, first and second terminals for connecting to the ring and tip leads of a telephone line, respectively, dial signal generating means, a coin signal generating circuit, a first relay including a coil, a telephone speech network, a plurality of contacts operated by a totalizer mechanism, means responsive to an off-hook condition for initiating a loop current flow from said first to said second terminals, thereby to alert a connecting central office to said off-hook condition, the path for said flow including said coil, a normally closed pair of said contacts, normally closed contacts of said dial signal generating means, operated closed switch hook contacts and a portion of said speech network, a source of reference potential, means for connecting said source to said second terminal via a portion of said speech network, said last named means comprising a conductive path including, in series circuit relation, a set of coin hopper trigger make contacts, a resistive device, the operating coil of a coin relay, a set of break contacts operated by said first relay, a set of said contacts operated by said totalizer and the reset electromagnet of said coin totalizer, and means for bypassing said last named contacts thereby to facilitate the detection of a ground signal indicative of an overtime deposit and to facilitate coin return.